United States Patent [19]

Binsack et al.

[11] 4,256,862

[45] Mar. 17, 1981

[54] POLYARYL-SULPHONES CONTAINING AN AMMONIUM OR METAL SALT OF AN ORGANIC SULPHONIC ACID

[75] Inventors: Rudolf Binsack, Krefeld; Joachim Wank; Eckart Reese, both of Dormagen, all of Fed. Rep. of Germany

[73] Assignee: Bayer Aktiengesellschaft, Fed. Rep. of Germany

[21] Appl. No.: 18,113

[22] Filed: Mar. 7, 1979

[30] Foreign Application Priority Data

Mar. 10, 1978 [DE] Fed. Rep. of Germany ....... 2810462

[51] Int. Cl.$^3$ ..................... C08F 283/00; C08G 75/23
[52] U.S. Cl. ..................................... 525/534; 525/535
[58] Field of Search ............................... 525/534, 535

[56] References Cited

U.S. PATENT DOCUMENTS

| 3,787,363 | 1/1974 | Staniland et al. | 525/535 |
| 4,021,395 | 5/1977 | Vary | 260/29.2 R |
| 4,092,291 | 5/1978 | Mark | 525/462 |

FOREIGN PATENT DOCUMENTS 1493933 9/1967 France .
2331602 10/1977 France .
2000720 1/1979 United Kingdom .

*Primary Examiner*—Edward M. Woodberry
*Attorney, Agent, or Firm*—Connolly and Hutz

[57] ABSTRACT

Modified polyaryl-sulphones comprise one or more polyaryl-sulphones and one or more ammonium salts or metal salts of organic sulphonic acids, preferably 0.01 to 5% by weight, relative to the total weight of polyaryl-sulphone plus salt of sulphonic acid, of the one or more organic sulphonic acid salts. These simply produced modified polyaryl-sulphones do not suffer from embrittlement under load, and susceptability to stress-cracking under the influence of solvents and of solutions of unsaturated polyester resins experienced by unmodified polyaryl-sulphones. The modified polyaryl-sulphones are particularly suitable for the production of containers, tubes, sheets and films.

9 Claims, No Drawings

POLYARYL-SULPHONES CONTAINING AN AMMONIUM OR METAL SALT OF AN ORGANIC SULPHONIC ACID

FIELD OF THE INVENTION

The present invention relates to polyaryl-sulphones containing ammonium salts or metal salts of organic sulphonic acids.

BACKGROUND OF THE INVENTION

Polyaryl-sulphones are a known class of thermoplastics and can be used in many ways (see, for example, Society of Plastics Engineers, 33rd Annual Technical Conference, May 5-8, 1975, pages 621 to 623).

The use of polyaryl-sulphones for certain industrial applications is restricted or even prevented by the embrittlement of the polyaryl-sulphones under load and the susceptibility of the polyaryl-sulphones to stress-cracking under the influence of solvents and under the action of solutions of unsaturated polyester resins.

It is proposed in DT-OS (German Published Specification) No. 1,719,244 and in U.S. Pat. No. 3,365,517 to reduce the undesired embrittlement of polysulphones under load by adding polymers, for example polycarbonates.

According to DT-OS (German Published Specification) No. 2,305,413 and U.S. Pat. No. 3,960,815, the susceptibility of polyaryl-ether-sulphones to stress-cracking is improved by branching of the polymer chain.

SUMMARY OF THE INVENTION

In contrast to these known solutions to the problems, the disadvantages mentioned initially of polyaryl-sulphones are solved in another more simple and also more comprehensive manner according to the present invention, by adding ammonium salts or metal salts of organic sulphonic acids to the polyaryl-sulphones preferably in amounts of about 0.01% by weight to 5% by weight, relative to the total weight of polyaryl-sulphone and salt of sulphonic acid.

DETAILED DESCRIPTION OF THE INVENTION

Polyaryl-sulphones in the sense of the present invention are polymeric compounds which have a $-SO_2-$ connecting link between two aryl nuclei in each case. They should have a $\overline{M}w$ (weight-average molecular weight, measured, for example, by means of light scattering) of about 10,000 to about 60,000, preferably of about 15,000 to about 50,000 and especially of about 20,000 to about 40,000.

The aryl nuclei can be mononuclear, dinuclear, trinuclear or tetranuclear, and the nuclei can be bonded via fusion, a single bond or bridge members and preferably contain between 6 and 24, in particular between 6 and 12 and very particularly 6, C atoms. The aryl nuclei can carry additional substituents, such as for example, $C_1-C_6$ alkyl, chlorine or bromine.

The polyaryl-sulphones which can be used according to the invention can be either linear or branched and they can be employed alone or as mixtures.

Polyaryl-sulphones which can be used according to the invention are described, for example, in the following literature references: DT-AS (German Published Specification) No. 1,520,131 (ICI), DT-AS (German Published Specification) No. 1,520,379 (3M), DT-AS (German Published Specification) No. 1,545,106 (UCC), DT-AS (German Published Specification) No. 1,720,648 and U.S. Pat. No. 3,532,670, DT-OS (German Published Specification) No. 1,770,593 and U.S. Pat. No. 3,622,541, DT-OS (German Published Specification) No. 1,795,120 and U.S. Pat. No. 3,634,354, DT-OS (German Published Specification) No. 1,932,067 and U.S. Pat. No. 3,647,751 and DT-OS (German Published Specification) No. 2,305,413 and U.S. Pat. No. 3,960,815.

The polyaryl-sulphones which can be used according to the invention can preferably be characterized by the following unit formula

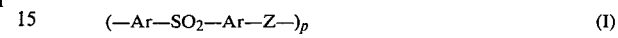

wherein
Ar are the above-mentioned aryl nuclei,
$-Z-$ represents either a single bond or also $-SO_2-$ or any desired bridge member of the polymer chain, and
"p" is the degree of polymerization, which is determined by the particular weight-average molecular weights $\overline{M}w$ within the above-mentioned ranges.

Ar can be, for example, p-phenylene, m-phenylene, biphenylene, oxybiphenylene, naphthylene or a divalent radical of the following formula (II)

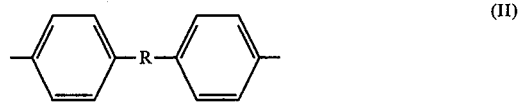

wherein R is a $C_1-C_{12}$-alkylene, $C_2-C_{12}$-alkylidene, $C_5-C_{12}$-cycloalkylene, $C_5-C_{12}$-cycloalkylidene, $C_7-C_{12}$-aralkylene, $C_7-C_{12}$-aralkylidene or a $C_8-C_{12}$-arylene-bis-alkylidene radical or the grouping $-O-$, $-S-$, $-SO-$, $-CO-$ or $-SO_2-$.

The polyaryl-sulphones which can be used according to the invention can be prepared by the known preparation processes for polyaryl-sulphones. Details of these processes can be found in the technical literature and in the literature references cited above.

In principle, the nature and structure of the ammonium salts or metal salts of organic sulphonic acids, which can be used according to the invention, is not restricted, but depends, with regard to the effect on the polyaryl-sulphone to be modified and with regard to compatibility with the polyaryl-sulphone to be modified, on the pattern of properties, desired in each individual case, of the polyaryl-sulphones to be modified, which in turn is determined by the intended application of the polyaryl-sulphones to be modified, envisaged in each individual case.

Of the metal salts of organic sulphonic acids, their alkali metal salts and alkaline earth metal salts are particularly suitable; of the ammonium salts of organic sulphonic acids, the $NH_4^+$ salts and tetra-($C_1-C_{18}$-alkyl)ammonium salts are particularly suitable.

Examples of possible alkali metal salts are those of lithium, sodium, potassium, rubidium and caesium, and examples of possible alkaline earth metal salts are those of beryllium, magnesium, calcium, strontium and barium.

Possible ammonium salts which can be used according to the invention are those with the cation of the following formula $[NR^1R^2R^3R^4]^+$, wherein $R^1$, $R^2$, $R^3$ and $R^4$ can be hydrogen, identical or different $C_1$-$C_{18}$-alkyl radicals, identical or different $C_7$-$C_{20}$-aralkyl radicals and identical or different $C_5$-$C_{20}$-cycloalkyl radicals.

In addition to the alkali metal salts and alkaline earth metal salts which are particularly suitable, possible metal salts which can be used according to the invention are also those of metals of group 8b of the periodic table, for example iron, chromium or nickel.

Suitable organic sulphonic acids for the ammonium salts and metal salts which can be used according to the invention are monomeric and polymeric sulphonic acids which can contain either one or several sulphonic acid groups, that is to say, for example, monosulphonic acids, disulphonic acids, trisulphonic acids, tetrasulphonic acids and the like.

The organic sulphonic acids can be aliphatic, cycloaliphatic, araliphatic and aromatic; they can contain any desired number of C atoms.

The organic sulphonic acids can be unsubstituted or substituted, there being no restriction with regard to the nature and number of the substituents since salts of sulphonic acids containing both substituents of the 1st order and substituents of the 2nd order and containing substituents having an electronegative action and substituents having an electropositive action are active according to the invention.

Sulphonic acids of this type and salts thereof are described, for example, in the following German Offenlegungsschriften (German Published Specifications): DT-OS (German Published Specification) No. 1,930,257, U.S. Pat. No. 3,775,367, DT-OS (German Published Specification) No. 2,253,072, DT-OS (German Published Specification) No. 2,149,311, DT-OS (German Published Specification) No. 2,506,726, U.S. Pat. Nos. 4,007,150 and 4,041,003, DT-OS (German Published Specification) No. 2,458,527, DT-OS (German Published Specification) No. 2,458,968, DT-OS (German Published Specification) No. 2,460,786, DT-OS (German Published Specification) No. 2,460,787, DT-OS (German Published Specification) No. 2,460,788, DT-OS (German Published Specification) No. 2,460,935, DT-OS (German Published Specification) No. 2,460,937, DT-OS (German Published Specification) No. 2,460,944, DT-OS (German Published Specification) No. 2,460,945, DT-OS (German Published Specification) No. 2,460,946, DT-OS (German Published Specification) No. 2,461,063, DT-OS (German Published Specification) No. 2,461,077, DT-OS (German Published Specification) No. 2,461,144, DT-OS (German Published Specification) No. 2,461,145, DT-OS (German Published Specification) No. 2,461,146, DT-OS (German Published Specification) No. 2,535,261, DT-OS (German Published Specification) No. 2,535,262, DT-OS (German Published Specification) No. 2,535,263, DT-OS (German Published Specification) No. 2,643,256, DT-OS (German Published Specification) No. 2,644,114, DT-OS (German Published Specification) No. 2,645,415, DT-OS (German Published Specification) No. 2,646,120, DT-OS (German Published Specification) No. 2,647,271, DT-OS (German Published Specification) No. 2,648,128, DT-OS (German Published Specification) No. 2,648,131 and DT-OS (German Published Specification) No. 2,653,327.

Examples of salts of sulphonic acids which are suitable according to the invention are those of $C_1$-$C_{20}$-alkyl-sulphonic acids, $C_6$-$C_{24}$-aryl-sulphonic acids, $C_6$-$C_{15}$-cycloalkyl-sulphonic acids and $C_7$-$C_{24}$-aralkyl-sulphonic acids, and of polymeric sulphonic acids. Sulphonic acids which contain one or more heterocyclic radicals are also suitable.

Particularly active salts of sulphonic acids are those which contain, in addition to the sulphonate group, other electronegative substituents. (With regard to the definition of electronegative substituents, see E. S. GOULD, Mechanismus und Struktur in der organischen Chemie (Mechanism and Structure in Organic Chemistry), Verlag Chemie, Weinheim, 1962, page 240 et seq..)

Particularly suitable electronegative substituents are halogen substituents, such as, for example, chlorine and bromine, and fluorine substituents are particularly suitable as electronegative substituents in the monomeric and polymeric sulphonic acids.

Salts of organic aliphatic halogenosulphonic acids of the general formula $$R-SO_3H$$

in which R is for $C_nH_mHal_{(2n+1)-m}$ in which
Hal = F, Cl or Br,
n is for an integer from 1 to 20 and
m is for an integer from 0 to 2n,
are particularly suitable.

Salts of monomeric or polymeric aromatic sulphonic acids of the general formula $$[Ar(SO_3H)_y]_p$$

in which
Ar is an aryl radical with 1 to 4 aromatic rings which preferably can also contain halogen substituents,
y is an integer, preferably 1 or 2, and
p corresponds to the degree of polymerization of the sulphonic acids and is preferably 1 to 20,
are also particularly suitable.

Examples of salts which are suitable according to the invention are the ammonium, alkali metal, alkaline earth metal and nickel salts of the following sulphonic acids: perfluoromethanesulphonic acid, perfluorobutanesulphonic acid, perfluorooctanesulphonic acid, eicosanedisulphonic acid, naphthalene-2,6-disulphonic acid, naphthalene-1,5-disulphonic acid, 4,4'-dichloro-1,1'-dinaphthyl-sulphone-5,5'-disulphonic acid, 3,3',4,4'-tetrachlorobenzil-5-sulphonic acid, 2,5-dibromothiophene-3-sulphonic acid, 4,4'-dichlorodiphenyl sulphide-3-sulphonic acid, tetrachlorodiphenyl ether-disulphonic acid, 2,3,4,5,6-pentachloro-betastyrenesulphonic acid, [pentachlorophenyl benzoate]-3-sulphonic acid, 3,5,6-trichloro-4-phthalate-sulphonic acid, 1',3'-bis-[1,4,5,6,7,7-hexachloro-bicyclo(2,2,1)-hept-5-enendo-2-yl]-benzenesulphonic acid, 2,4,5-trichlorobenzene-sulphanilide-4'-sulphonic acid, 3-(trifluoromethyl)-5-bromobenzenesulphonic acid, 3-chlorobenzenesulphonic acid, oxybisphenyl-4,4'-disulphonic acid, 2-naphthol-6-sulphonic acid, 2-naphthol-6,8-disulphonic acid, 3-carboxy-benzenesulphonic acid, 4,4'-diaminostilbene-2,2'-disulphonic acid, 4-chlorobenzenesulphonic acid and 2,5-dichlorobenzenesulphonic acid.

The sodium salts and potassium salts of the above-mentioned sulphonic acids are particularly suitable.

Examples of suitable salts are sodium 3-chlorobenzene-sulphonate, di-sodium naphthalene-1,5-disulphonate, di-potassium oxybisphenyl-4,4'-disulphonate, sodium 2-naphthol-6-sulphonate, di-potassium 2-naphthol-6,8-disulphonate, the di-sodium salt of 3-carboxy-benzene-sulphonic acid, di-sodium, 4,4'-diamino-stilbene-2,2'-disulphonate, sodium 4-chloro-benzene-sulphonate, sodium, 2,5-dichlorobenzene-sulphonate and potassium perfluorobutanesulphonate.

The salts, which can be used according to the invention, of the monomeric or polymeric organic sulphonic acids can be prepared by known methods from the corresponding sulphonic acids.

In principle, the amount of salts, of sulphonic acids, which can be used according to the invention is not limited and preferably can vary between about 0.01% by weight and 5% by weight, relative to polyaryl-sulphone + salt of sulphonic acid, depending on the desired pattern of properties and the intended use. The minimum amount of sulphonates is determined by the minimum activity of the sulphonates in the polyaryl-sulphones and the maximum amount of sulphonates is determined by the avoidance of side-reactions of the sulphonates in the polyaryl-sulphones or by the prevention of the occurrence of electrolytic contact corrosion.

The salts, of sulphonic acids, which can be used according to the invention can be employed either alone or as mixtures.

The salts, which can be used according to the invention, of sulphonic acids are incorporated into the polyaryl-sulphones by known processes, for example by mixing polyaryl-sulphone granules with the appropriate amounts of salt of sulphonic acid and melting and homogenizing the mixture in a single-screw machine or a twin-screw machine. It is also possible to meter the sulphonate directly into the melt of the polyaryl-sulphone, and in particular either in the pure form or in the form of a concentrate in the polyaryl-sulphone (masterbatch method).

The melt of the mixtures according to the invention can be extruded as a strand, and granulated, by customary methods. It can also be extruded direct through an appropriate profile die to give shaped articles.

The mixtures, according to the invention, of polyaryl-sulphones and salts of organic sulphonic acids can be shaped on the known processing machines by known methods to give shaped extruded articles or injection-molded articles, depending on the intended use. Particular fields of application are containers, tubes, sheets and films.

Additives of the customary type can be added to the mixtures, according to the invention, of polyaryl-sulphones and salts of organic acids before, during or after mixing the components.

In this connection there may be mentioned, for example, dyestuffs, pigments, mold-release agents, stabilizers against the action of moisture, heat and UV light, lubricants, fillers, such as glass powders or glass balls, quartz products, graphite, molybdenum sulphide, metal powders, powders of higher-melting plastics, for example polytetrafluoroethylene powder, natural fibers, such as cotton, sisal and asbestos, and furthermore glass fibers of the most diverse type, metal filaments, and fibers which are stable during the residence of the polyaryl-sulphones in the melt and which do not noticeably damage the polyaryl-sulphones.

The examples which follow are intended to illustrate the subject of the present invention:

EXAMPLES

EXAMPLE 1

A branched polyaryl-sulphone prepared by reacting 0.25 mol of 2,2-bis-(4-hydroxyphenyl)-propane, 0.0025 mol of 2,6-bis-(2'-hydroxy-5'-methyl-benzyl)-4-methyl-phenol and 0.25375 mol of 4,4'-dichlorodiphenyl-sulphone and having a $\overline{M}w$ of 30,000 was dusted with 0.52% by weight of the sodium salt of 2,5-dichlorobenzenesulphonic acid and melted on a twin-screw extruder. The melt was homogenized at about 340° C. and extruded as a strand into a waterbath. The cooled strand was granulated and, after drying, the granules were remelted at about 290° C. in a single-screw extruder with a degassing zone.

The melt was extruded through a sheet die and drawn off via a chill-roll unit to give films about 40 μm thick. The resulting properties are listed in the table which follows.

EXAMPLE 2 is the comparison example with pure polyaryl-sulphone films of corresponding thickness.

EXAMPLES 3 to 13

A linear polyaryl-sulphone prepared by polycondensation of 4,4'-dichlorodiphenyl-sulphone and bis-2-(4-hydroxyphenyl)-propane and with a $\overline{M}w$ of 20,000 was melted with various salts of sulphonic acids, according to Example 1, and processed to films.

The table which follows gives the properties measured.

A film made of pure branched polyaryl-sulphone is used for comparison.

| | | | Mechanical properties of the film | | | |
|---|---|---|---|---|---|---|
| | | | Tensile strength | | Elongation in %[1] | |
| Example | Type of salt of sulphonic acid | % | in MPA[1] starting film | film after storage[2] | starting film | film after storage[2] |
| 1 | Na salt of 2,5-dichlorobenzenesulphonic acid | 0.52 | 70 | 70 | 90 | 20 |
| 2 | — | — | 70 | 58 | 90 | 10 |
| 3 | K salt of perfluorobutanesulphonic acid | 0.70 | 70 | 70 | 100 | 50 |
| 4 | Na salt of 3-chlorobenzenesulphonic acid | 0.44 | 73 | 65 | 100 | 30 |
| 5 | Na$_2$ salt of naphthalene-1,5-disulphonic acid | 0.34 | 70 | 63 | 50 | 10 |
| 6 | K$_2$ salt of oxybisphenyl-4,4'-disulphonic acid | 0.42 | 70 | 65 | 50 | 10 |
| 7 | Na salt of 2-naphthol-6-sulfonic acid | 0.51 | 70 | 65 | 50 | 20 |
| 8 | K$_2$ salt of 2-naphthol-6,8-disulphonic acid | 0.39 | 70 | 65 | 60 | 20 |
| 9 | Na$_2$ salt of 3-carboxy-benzenesulphonic acid | 0.51 | 65 | 60 | 50 | 20 |
| 10 | Na$_2$ salt of 4,4'-diaminostilbene-2,2'-disulphonic acid | 0.43 | 70 | 70 | 80 | 20 |
| 11 | Na salt of 4-chlorobenzenesulphonic acid | 0.44 | 75 | 65 | 100 | 30 |
| 12 | Na salt of 2,5-dichlorobenzenesulphonic acid | 0.52 | 70 | 65 | 80 | 50 |

| Example | Type of salt of sulphonic acid | % | Mechanical properties of the film | | | |
|---|---|---|---|---|---|---|
| | | | Tensile strength in MPA[1] | | Elongation in %[1] | |
| | | | starting film | film after storage[2] | starting film | film after storage[2] |
| 13 | — | — | 75 | 40 | 100 | 4 |

[1]measured according to DIN 53,455
[2]after storage for 10 seconds in toluene/n-propanol 1:3

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A modified polyaryl-sulphone comprising one or more polyaryl-sulphones and one or more ammonium salts or metal salts of organic monomeric sulphonic acids, said polyaryl-sulphone having the unit formula $$(Ar-SO_2-Ar-Z-)_p$$

wherein Ar is a mononuclear, dinuclear, trinuclear or tetranuclear radical in which the nucleus is bonded by fusion, a single bond or a bridge member, —Z— is a single bond, —SO$_2$— or another bridge member and p is the degree of polymerization giving a weight average molecular weight of between about 10,000 and 60,000.

2. A modified polyaryl-sulphone according to claim 1 comprising one or more polyaryl-sulphones and about 0.01 to 5% by weight of one or more ammonium salts or metal salts of organic monomeric sulphonic acids, said percent by weight being relative to the total weight of polyaryl-sulphones plus salt of organic acid.

3. The modified polyaryl-sulphone of claim 1 in which Ar is p-phenylene, m-phenylene, biphenylene, oxybiphenylene, naphthylene or a divalent radical of the formula

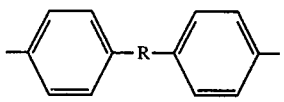

wherein R is $C_1$–$C_{12}$ alkylene, $C_2$–$C_{12}$ alkylidene, $C_5$–$C_{12}$ cycloalkylene, $C_5$–$C_{12}$ cycloalkylidene, $C_7$–$C_{12}$ aralkylene, $C_7$–$C_{12}$ aralkylidene, $C_8$–$C_{12}$ arylene-bis-alkylidene, —O—, —S—, —SO—, —CO— or —SO$_2$—.

4. The modified polyaryl-sulphone of claim 1, 2 or 3 wherein the organic monomeric sulphonic acid salt is the salt of either an alkali metal or an alkaline earth metal.

5. The modified polyaryl-sulphone of claim 1 wherein said salt is derived from acid of the formula $$C_nH_m(Hal)_{(2n+1)-m}SO_3H$$

where Hal represents F, Cl or Br, n is an integer between 1 and 20 and m is an integer between 0 and 2n.

6. The modified polyaryl-sulphone of claim 1 wherein the salt is derived from an acid of the formula $$Ar(SO_3H)_y$$

wherein Ar is an aryl radical having 1 to 4 aromatic rings which may be halogen substituted and y is an integer of 1 to 2.

7. A process for improving the stress-cracking resistance of a polyaryl-sulphone which comprises intimately incorporating into said polyaryl-sulphone an effective amount of ammonium or metal salt of an organic monomeric sulphonic acid, said polyaryl-sulphone being of the unit formula $$(Ar-SO_2-Ar-Z-)_p$$

wherein Ar is a mononuclear, dinuclear, trinuclear or tetranuclear radical in which the nucleus is bonded by fusion, a single bond or a bridge member, —Z— is a single bond, —SO$_2$— or another bridge member and p is the degree of polymerization giving a weight average molecular weight of between about 10,000 and 60,000.

8. A process for producing a polyaryl-sulphone article having improved stress-cracking resistance which comprises forming the article from the modified polyaryl-sulphone of claim 1.

9. The process of claim 8 wherein said article is a film.

* * * * *